(12) United States Patent
Huang

(10) Patent No.: US 9,778,482 B1
(45) Date of Patent: Oct. 3, 2017

(54) PAIR OF EYEGLASSES WITHOUT TEMPLES

(71) Applicant: Wen-Tse Huang, Kaohsiung (TW)

(72) Inventor: Wen-Tse Huang, Kaohsiung (TW)

(*) Notice: Subject to any disclaimer, the term of this patent is extended or adjusted under 35 U.S.C. 154(b) by 0 days.

(21) Appl. No.: 15/263,403

(22) Filed: Sep. 13, 2016

(51) Int. Cl.
*G02C 5/06* (2006.01)
*G02C 5/12* (2006.01)

(52) U.S. Cl.
CPC ............... *G02C 5/128* (2013.01); *G02C 5/06* (2013.01); *G02C 2200/08* (2013.01); *G02C 2200/16* (2013.01)

(58) Field of Classification Search
CPC ... G02C 5/12; G02C 5/02; G02C 5/16; G02C 1/04; G02C 5/06; G02C 1/08; G02C 3/003; G02C 5/143
USPC ....... 351/123, 111, 124, 158, 136, 137, 138, 351/140, 70, 65, 41, 131, 126; D16/315
See application file for complete search history.

(56) References Cited

U.S. PATENT DOCUMENTS 7,066,592 B2 * 6/2006 Rose ...................... G02C 3/003
351/124

* cited by examiner

*Primary Examiner* — Hung Dang
(74) *Attorney, Agent, or Firm* — Alan D. Kamrath; Kamrath IP Lawfirm, P.A.

(57) ABSTRACT

A pair of eyeglasses without temples includes two spectacles frames, an elastic connection piece, and two nose pads. Each of the spectacles frames accommodates a lens internally. The elastic connection piece is integrated between the spectacles frames and includes a horizontal top and two interconnecting portions respectively extending downward from two ends of the top. Each of the nose pads is integrated with an inner side of a corresponding spectacles frame and includes a pad body and a bonding segment. The pad body has a mounting hole internally in which a lower segment of one of interconnecting portions is engaged. The bonding segment has an upper portion with a groove internally in which a top segment of the inner side of one of the spectacles frames is engaged.

2 Claims, 4 Drawing Sheets

PAIR OF EYEGLASSES WITHOUT TEMPLES

BACKGROUND OF THE INVENTION

1. Field of the Invention

The present invention relates to a pair of eyeglasses and, more particularly, to a pair of eyeglasses with no temples connected but replaceable lenses installed

2. Description of the Related Art

A pair of conventional eyeglasses usually includes a spectacles frame and two temples pivotally fitted at both sides of the spectacles frame. The spectacles frame is provided with a unit of nose pads centrally and two pivotal portions at both sides thereof, respectively. A front end of each temple is integrated with one of the pivotal portions of the spectacles frame by a screw, so that each temple can perform inward folding or outward stretching movement related to the spectacles frame. A user who intends to wear a pair of eyeglasses has to hang the temples on his/her ears and lean the unit of nose pads on the nasal bridge. However, the user who wears a pair of eyeglasses for a long time may feel uncomfortable because of the temples compressing auricles. Moreover, lenses of a pair of conventional eyeglasses cannot be replaced easily.

BRIEF SUMMARY OF THE INVENTION

Thus, an objective of the present invention is to provide a pair of eyeglasses which is applicable to sedentary activities such as reading and watching TV for no discomfort of a user's auricles compressed by temples for a long time.

To achieve this and other objectives, a pair of eyeglasses of the present invention includes two spectacles frames, an elastic connection piece, and two nose pads. Each spectacles frame accommodates a lens internally. The elastic connection piece is integrated between the spectacles frames and includes a horizontal top and two interconnecting portions respectively extending downward from two ends of the top. Each of the interconnecting portions has an upper segment linking and inward tilted from the top. Each interconnecting portion further has a lower segment extending downward from the upper segment. Each nose pad is integrated with an inner side of a corresponding spectacles frame and includes a pad body and a bonding segment. The pad body includes a mounting hole internally in which the lower segment of one of the interconnecting portions is engaged. The bonding segment includes a lower portion linking the pad body and an upper portion extending upward from the lower portion and having a groove internally in which a top segment at inner side of one of the spectacles frames is engaged.

In a preferred form, the nose pads are separated by a spacing which is less than the width of a user's nasal bridge. Each of the interconnecting portions has two insert holes in the lower segment. Each of the spectacles frames has an opening in the inner side thereof and two terminals separated from each other by the opening. Each of the terminals has a joint pin extending outward and engaged in a corresponding insert hole of the elastic connection piece. The upper portion of the bonding segment leans against the upper segment of one of the interconnecting portions.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
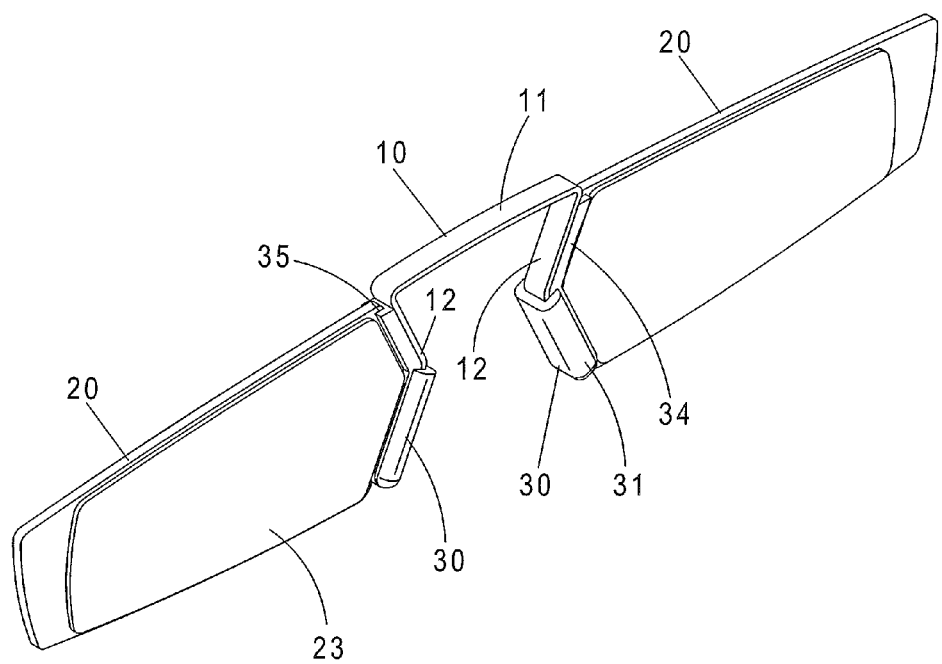
FIG. 1 is a perspective view of a pair of eyeglasses without temples of the present invention.
Figure 2:
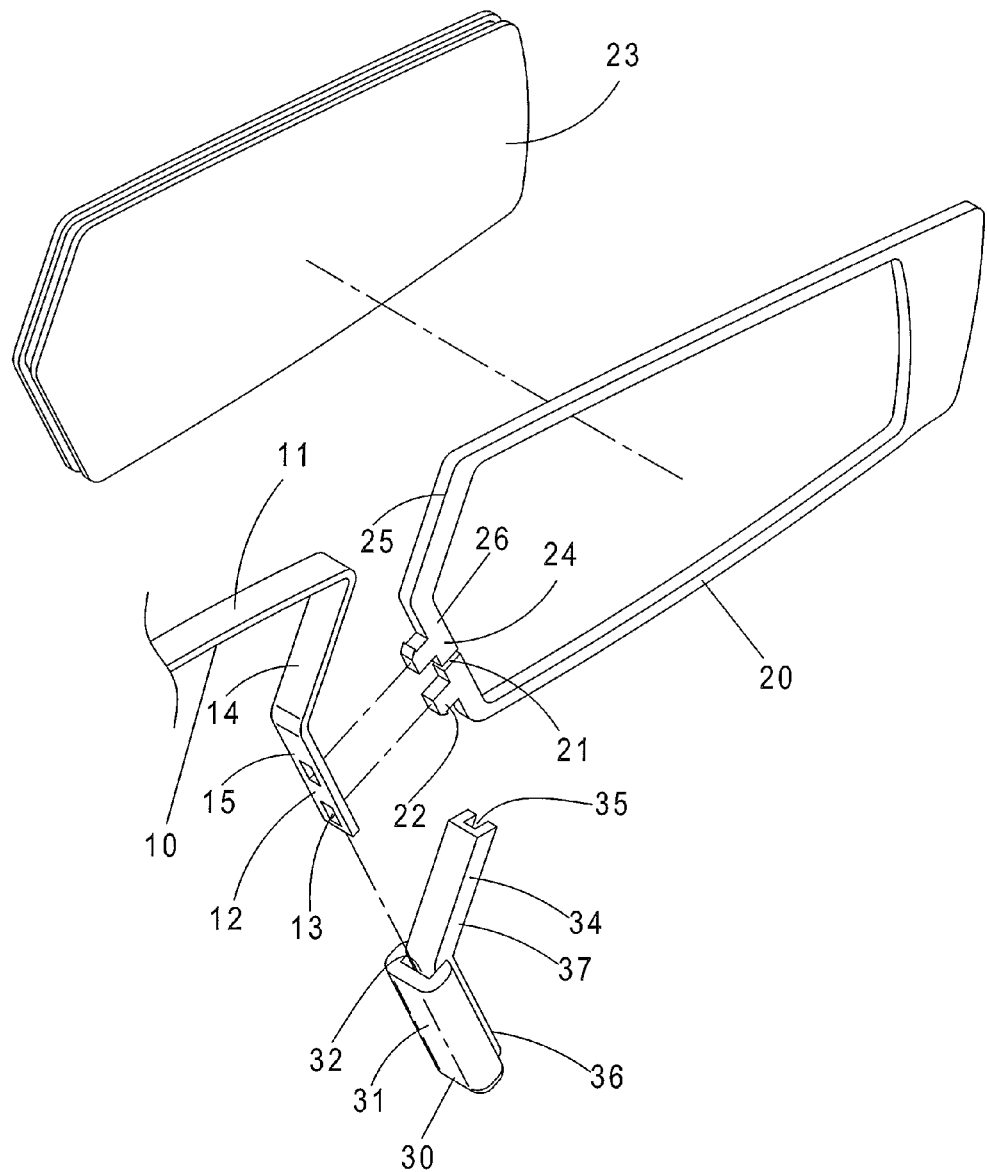
FIG. 2 is a partial, exploded view of the eyeglasses in FIG. 1.

A pair of eyeglasses according to an embodiment of the present invention is shown in FIGS. 1 through 4 of the drawings and generally includes an elastic connection piece 10, two spectacles frames 20, and two nose pads 30. The elastic connection piece 10 is integrated between the spectacles frames 20 and includes a horizontal top 11 and two flexible interconnecting portions 12 extending downward from two ends of the top 11. Each of the interconnecting portions 12 has an upper segment 14 linking the top 11 and a lower segment 15 extending downward from the upper segment 14. Both the upper segment 14, which is inward tilted from the top 11, and the top 11 form an included angle less than 90 degrees. Both the lower segment 15, which is outward tilted from the upper segment 14, and the upper segment 14 form an included angle greater than 90 degrees for resilience of the interconnecting portion 12. The interconnecting portion 12 has at least an insert hole 13 in the lower segment 15. In this embodiment, two insert holes 13 are provided in the lower segment 15.

Each of the spectacles frames 20 accommodates a lens 23 internally. In this embodiment, each of the spectacles frames 20 has an opening 21 in an inner side 26 thereof and two terminals 24 separated from each other by the opening 21. When the spectacles frame 20 is stretched from the terminals 24, one lens 23 to be replaced can be removed from the spectacles frame 20 inside out. A joint pin 22 extends outward from each terminal 24 of the spectacles frame 20 and is inserted and fixed in a corresponding insert hole 13 of the elastic connection piece 10.

Figure 3:
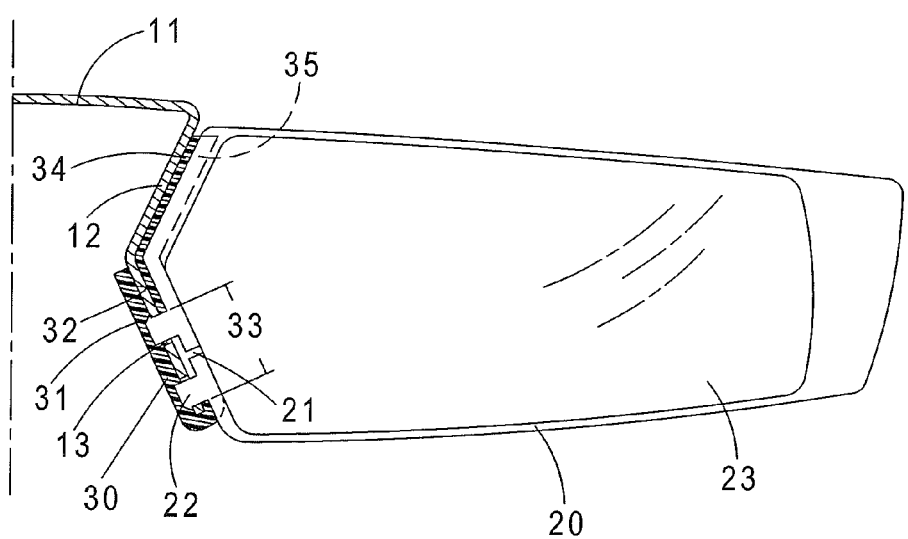
FIG. 3 is a partial, sectional view of the eyeglasses in FIG. 1.

Each of the nose pads 30 is a soft elastomer and integrated with the inner side 26 of a corresponding spectacles frame 20. Each of the nose pads 30 includes a pad body 31 and a bonding segment 34. The pad body 31 has a mounting hole 32 internally in which the lower segment 15 of one of the interconnecting portions 12 is inserted. The bonding segment 34 has a lower portion 36 connected to the pad body 31 and an upper portion 37 upward extending from the lower portion 36. The lower portion 36 has a through-hole 33 in communication with the mounting hole 32 and penetrated by the joint pins 22 of one of the spectacles frames 20, such that the joint pins 22 can be respectively engaged in the insert holes 13 of the elastic connection piece 10 via the through-hole 33 (FIG. 3). Because the upper portion 37 and the lower portion 36 form an included angle greater than 90 degrees, the upper portion 37 leans against an outer face of the upper segment 14 of one interconnecting portion 12 with the lower segment 15 of the interconnecting portion 12 inserted in the mounting hole 32 of the pad body 31. Furthermore, the upper portion 37 of the bonding segment 34 has a groove 35 internally in which a top segment 25 at the inner side 26 of the spectacles frame 20 is inserted and held, so that the upper portion 37 of the bonding segment 34 is engaged between the top segment 25 of the spectacles frame 20 and the upper segment 14 of the interconnecting portion 12.

In assembly of the pair of eyeglasses of the present invention, the lower segment 15 of each of the interconnecting portions 12 of the elastic connection piece 10 is engaged in the mounting hole 32 of a corresponding pad body 31. Then, the joint pins 22 of each of the spectacles frames 20 penetrate the through-hole 33 of one of the bonding segments 34 and are engaged in the insert holes 13 of the lower segment 15, and the top segment 25 of each spectacles frame 20 is engaged in the groove 35 of a corresponding bonding segment 34 for the elastic connection piece 10 securely held between the spectacles frames 20. A spacing between the nose pads 30 is slightly less than the width of a user's nasal bridge, and the elastic connection piece is a bow-shaped and stretchable. When the interconnecting portions 12 of the elastic connection piece 10 are stretched by external force, the initial spacing between the nose pads 12 is widened. When the external force is removed, the initial spacing between the nose pads 12 is restored because of elasticity of the elastic connection piece 10. Thus, the pair of eyeglasses of the present invention can match a user's face contour and head size.

Figure 4:
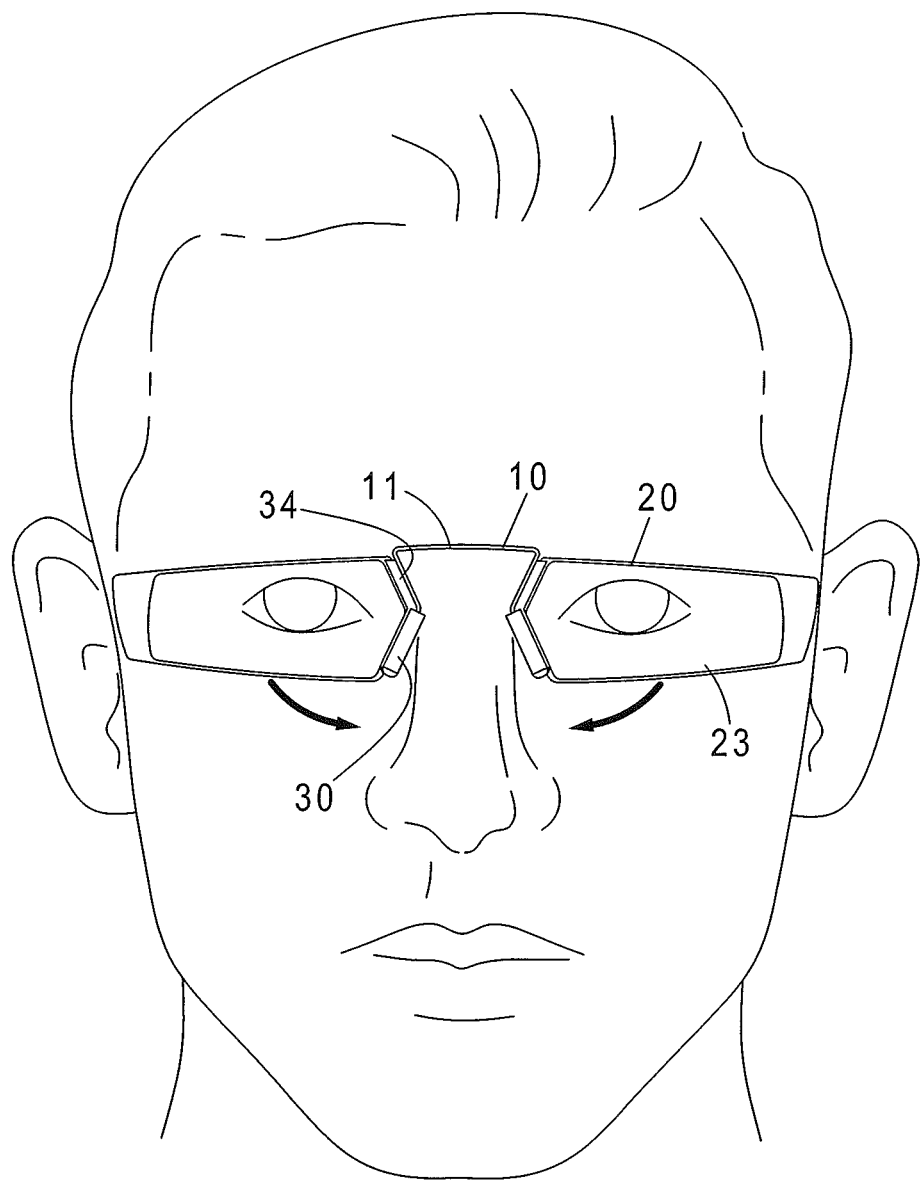
FIG. 4 is a schematic view which illustrates the eyeglasses in FIG. 1 is worn on a user's face.

In an embodiment of the pair of eyeglasses of the present invention worn on a user's face, the spectacles frames 20, which are stretched by two hands for a greater spacing between the nose pads 30, are positioned on front of the user's eyes and the user's nasal bridge is clipped by the nose pads 30 because of resilience of the elastic connection piece 10 with hands released (FIG. 4).

It should be reiterated that the pair of eyeglasses of the present invention, which is applicable to sedentary activities such as reading and watching TV for no discomfort of auricles compressed by temples for a long time, is not designed for steadiness of the pair of eyeglasses worn on a user. In this embodiment, the joint pins 22 can be separated from the insert holes 13 for replacement of lenses 23. In another feasible embodiment, the elastic connection piece 10 and the spectacles frames 20 can be welded or engaged as an integral body.

The scope of the invention is to be indicated by the appended claims, rather than by the foregoing description, and all changes which come within the meaning and range of equivalency of the claims are intended to be embraced therein.

The invention claimed is:

1. A pair of eyeglasses without temples, comprising:
    two spectacles frames, each of which accommodates a lens internally;
    an elastic connection piece integrated between the two spectacles frames and including a horizontal top and two interconnecting portions respectively extending downward from two ends of the top, with each of the two interconnecting portions having an upper segment linking and inward tilted from the top, with each of the interconnecting portions further having a lower segment extending downward from the upper segment; and
    two nose pads, each of which is integrated with an inner side of a corresponding spectacles frame and includes a pad body and a bonding segment, with the pad body including a mounting hole internally in which the lower segment of one of the two interconnecting portions is engaged, with the bonding segment including a lower portion linking the pad body and an upper portion extending upward from the lower portion and having a groove internally in which a top segment at the inner side of one of the two spectacles frames is engaged.

2. The pair of eyeglasses without temples according to claim 1, wherein each of the two interconnecting portions has two insert holes in the lower segment thereof, with each of the two spectacles frames having an opening in the inner side thereof and two terminals separated from each other by the opening, with a joint pin extending outward from each of the two terminals and engaged in a corresponding insert hole of the elastic connection piece, with the upper portion of the bonding segment leaning against the upper segment of one of the two interconnecting portions.

* * * * *